United States Patent
Dam-Huisman

(10) Patent No.: US 12,440,257 B2
(45) Date of Patent: Oct. 14, 2025

(54) TOOL FOR CRYOSURGERY

(71) Applicant: Crea IP B.V., Vierpolders (NL)

(72) Inventor: Adriaantje Coliene Dam-Huisman, Delfgauw (NL)

(73) Assignee: Crea IP B.V., Vierpolders (NL)

( * ) Notice: Subject to any disclaimer, the term of this patent is extended or adjusted under 35 U.S.C. 154(b) by 513 days.

(21) Appl. No.: 17/057,124

(22) PCT Filed: May 22, 2019

(86) PCT No.: PCT/NL2019/050297
§ 371 (c)(1),
(2) Date: Nov. 20, 2020

(87) PCT Pub. No.: WO2019/226049
PCT Pub. Date: Nov. 28, 2019

(65) Prior Publication Data
US 2021/0196338 A1    Jul. 1, 2021

(30) Foreign Application Priority Data

May 22, 2018   (NL) ..................................... 2020965

(51) Int. Cl.
*A61B 18/02*     (2006.01)
*A61B 18/00*     (2006.01)
*A61F 9/007*     (2006.01)

(52) U.S. Cl.
CPC .............. *A61B 18/02* (2013.01); *A61F 9/007* (2013.01); *A61B 2018/00041* (2013.01);
(Continued)

(58) Field of Classification Search
CPC ............ A61B 18/02; A61B 2018/0231; A61B 2018/0293; A61B 2018/00452;
(Continued)

(56) References Cited

U.S. PATENT DOCUMENTS 3,575,176 A * 4/1971 Crump .................. A61B 18/02
606/26
3,933,156 A * 1/1976 Riggi ..................... A61B 18/02
606/26
(Continued)

FOREIGN PATENT DOCUMENTS

WO   WO-2014035862 A1 * 3/2014 ....... A61B 17/32056

*Primary Examiner* — Ronald Hupczey, Jr.
*Assistant Examiner* — Ana V Guerrero Rosario
(74) *Attorney, Agent, or Firm* — Ipsilon USA—NLO

(57) ABSTRACT

A tool for cryosurgery for handling tissue is disclosed, which is particularly suited for ophthalmic applications. The tool for cryosurgery (1) comprises a tubular body (2), a container (3) positioned within the tubular body (2) for holding cryogenic fluid and a treatment tip (4) connected to a distal end (2a) of the tubular body (2). A capillary (5) for transporting cryogenic fluid from the container (3) to the treatment tip (4) is also provided. The treatment tip (4) comprises a closed off end tip (6) and a shaft (7) of thermally insulating material having an inner lumen (8) with a diameter ($d_i$) which is larger than an outer diameter ($d_o$) of the capillary (5), the shaft (7) being sealingly coupled to the closed off end tip (6).

21 Claims, 3 Drawing Sheets

(52) U.S. Cl.
CPC .............. *A61B 2018/00095* (2013.01); *A61B 2018/00101* (2013.01); *A61B 2018/00922* (2013.01); *A61B 2018/0212* (2013.01); *A61B 2018/0231* (2013.01)

(58) Field of Classification Search
CPC .. A61B 2017/00747; A61B 2018/0262; A61B 2018/00101; A61B 2018/0268; A61B 2018/0275; A61B 2018/0281; A61B 2018/0287; A61B 2018/0218; A61B 18/1206; A61B 2018/00875; A61B 2018/126; A61B 2018/1266; A61B 18/14; A61B 2018/1273; A61B 2018/128; A61B 2018/00642; A61B 2018/00761; A61B 2018/1293; A61B 2090/065; A61B 18/12; A61B 2018/00636; A61B 2018/00696; A61B 2018/00732; A61B 2018/00845; A61B 18/1226; A61B 18/1233; A61B 18/1246; A61F 9/007
See application file for complete search history.

(56) References Cited

U.S. PATENT DOCUMENTS

| | | | |
|---|---|---|---|
| 3,951,152 A | | 4/1976 | Crandell et al. |
| 5,827,299 A | * | 10/1998 | Thomason ....... A61B 17/06066 606/205 |
| 6,162,210 A | | 12/2000 | Shadduck |
| 6,193,644 B1 | | 2/2001 | Dobak, III et al. |
| 2002/0120258 A1 | * | 8/2002 | Lalonde ................ A61B 18/02 606/23 |
| 2008/0119833 A1 | | 5/2008 | Vancelette et al. |
| 2008/0154254 A1 | * | 6/2008 | Burger .................. A61B 18/02 606/23 |
| 2008/0183164 A1 | | 7/2008 | Elkins et al. |
| 2011/0152850 A1 | * | 6/2011 | Niedbala ........... A61B 18/0218 606/22 |
| 2014/0276703 A1 | * | 9/2014 | McKay ................ A61B 18/02 606/21 |
| 2019/0015146 A1 | * | 1/2019 | DuBois ................ A61B 17/24 |

* cited by examiner

TOOL FOR CRYOSURGERY

FIELD OF THE INVENTION

The present invention relates to a tool for cryosurgery for handling tissue, in particular for handling tissue in ophthalmic procedures. More particularly, the tool for cryosurgery comprises a container for holding cryogenic fluid and a treatment tip which can be cooled with the cryogenic fluid.

BACKGROUND ART

Treatment tips for delivering cryogenic cooling fluid for targeted treatment of the body are known.

International Publication No. WO2014/114696 A1 describes an applicator for the non-surgical cold treatment of disorders such as warts. The device comprises a container for cryogenic refrigerant in fluid communication with a chamber comprising a porous heat exchanger. The porous heat exchanger is in thermal contact with a closed contact member which is exposed to an outer side of the applicator.

International Publication No. WO01/41683 A1 describes an applicator for the application of cryogenic cooling fluid to a targeted location on the body (e.g. skin). The device comprises a storage of cryogenic fluid and a capillary for delivering cryogenic fluid to an outlet at the distal end of the applicator.

SUMMARY OF THE INVENTION

The present invention seeks to provide an improved cryotherapy tool, which is configured to be hand-held with a self-contained supply of cryogenic fluid. More particularly, embodiments of the present invention provide a tool for cryosurgery that can provide rapid and accurately targeted cooling of tissue.

According to the present invention, there is provided a tool for cryosurgery for handling tissue, especially for ophthalmology applications, comprising a tubular body, a container for holding cryogenic fluid, the container being positioned within the tubular body, and a treatment tip connected to a distal end of the tubular body. A capillary is provided for transporting cryogenic fluid from the container to the treatment tip. The treatment tip comprises a closed off end tip and a shaft of thermally insulating material having an inner lumen with a diameter ($d_l$) which is larger than an outer diameter ($d_o$) of the capillary. The shaft is sealingly coupled to the closed off end tip.

The open capillary is disposed inside of the sealed shaft, which thus provides a closed off return path for cooling fluid that has been delivered to the treatment tip to return to the tubular body. This ensures cooling of the treatment tip without allowing cryogenic fluid to escape from the treatment tip into the treatment site. Thus, a patient being treated does not come into contact with the cryogenic fluid.

A further possible advantage of the present invention is that the closed off end tip can easily be attached to the shaft, e.g. by using a press fit or similar arrangement. This allows for a simple manufacturing process, which is of particular benefit in the context of disposable or limited use medical instruments.

Moreover, because the shaft is formed of a thermally insulating material, the shaft does not cool quickly (relative to the closed off tip portion). Therefore, most of the cooling energy from expanding and/or evaporating cryogenic fluid (at the end of the capillary) is transferred to the tip. This keeps the cooling effect local and increases the cooling rate significantly.

Optional features are described in the dependent claims.

SHORT DESCRIPTION OF DRAWINGS

The present invention will be discussed in more detail below, with reference to the attached drawings, in which.

DESCRIPTION OF EMBODIMENTS

Figure 1:
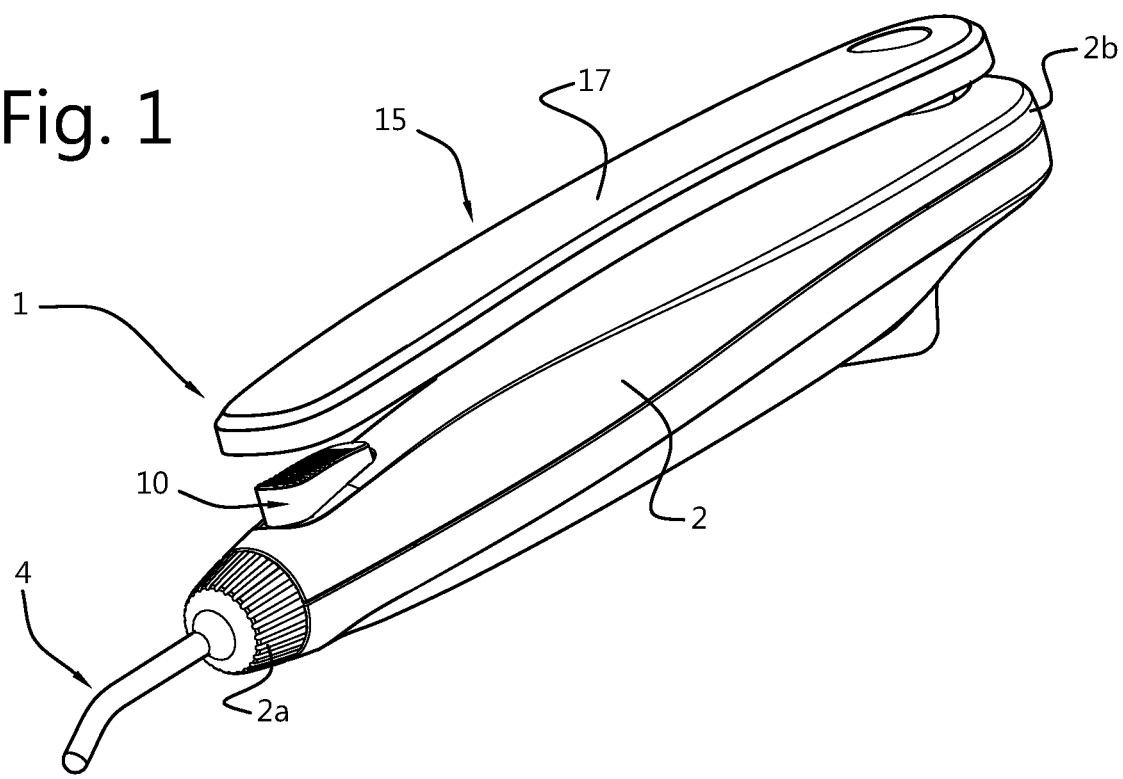
FIG. 1 shows a perspective view of a tool for cryosurgery according to embodiments of the present invention.

As shown in FIG. 1, embodiments of the present invention comprise a tool for cryosurgery 1 for handling tissue. The tool for cryosurgery 1 is particularly suited to handling tissue in ophthalmic applications. However, the skilled person will appreciate that the advantages associated with the present invention may also be realised in other cryotherapy applications.

The tool for cryosurgery 1 comprises a tubular body 2 and a container 3 positioned within the tubular body 2 for holding cryogenic fluid. A treatment tip 4 is connected to a distal end 2a of the tubular body 2 and a capillary 5 is provided for transporting cryogenic fluid from the container 3 to the treatment tip 4. The treatment tip 4 comprises a closed off end tip 6 and a shaft 7 of thermally insulating material. An inner lumen 8 extends through the shaft 7 and has a diameter ($d_l$) which is larger than an outer diameter ($d_o$) of the capillary 5. The shaft 7 is sealingly coupled to the closed off end tip 6. The sealing of the shaft 7 to the closed off end tip 6 provides a closed off return path for fluid that has escaped from the open distal end 5a of the capillary 5. The container 3 can be a cartridge containing a compressed gas, e.g. $N_2O$ or $CO_2$.

It is noted that the tubular body 2 is a generally tube shaped body allowing to use generally elongate compressed gas container 3, but may have a different shape to accommodate the container 3 and the further components as described During use, cryogenic fluid flows from the container 3, through the capillary 5 extending through the shaft 7 to the closed off end tip 6. At the closed off end tip 6, the cryogenic fluid escapes from the open distal tip of the capillary 5 and expands and/or evaporates into the sealed void formed by the shaft 7 and the closed-off end tip 6. The closed off end tip 6 can thus be used to cool target tissue rapidly to provide cryotherapeutic treatment of the tissue.

Figure 2:
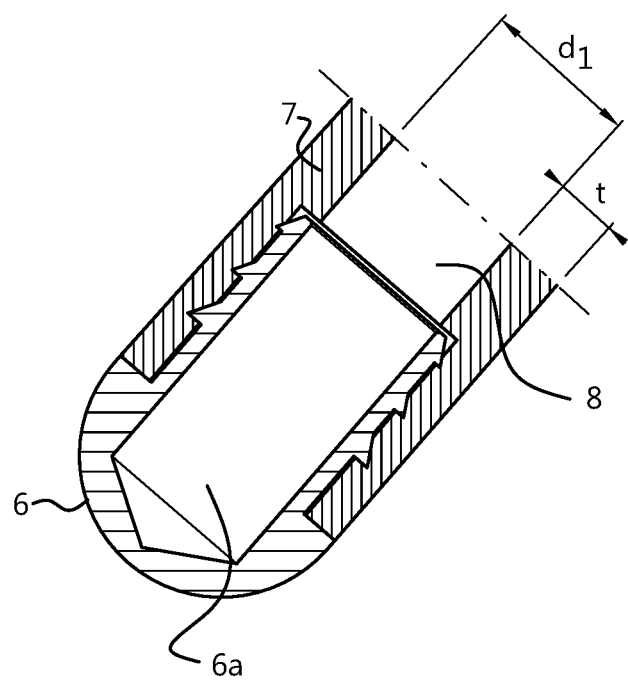
FIG. 2 shows a cross-sectional side view of the distal tip of the tool for cryosurgery of FIG. 1.

FIG. 2 shows a magnified cross-sectional view of the distal end of the shaft 7 and the closed off end tip 6. As shown in FIG. 2, the closed off end tip 6 can comprise a bore 6a in communication with the inner lumen 8 of the shaft 7. By providing a bore in the closed off end tip 6, the thermal mass of the tip can be reduced, thus allowing rapid cooling (and reheating) of the end tip 6. Moreover, the bore 6a in the end tip 6 provides well defined expansion area at the end of the capillary 5, into which the cryogenic fluid supplied through the capillary 5 can expand and/or evaporate. To ensure that the cryogenic fluid is delivered directed to the thermally conductive closed off end portion, the capillary 5 can be arranged to have its open distal end disposed within the bore 6a of the tip 6.

Advantageously, the closed off end tip 6 comprises a material with a high thermal conductivity. For example, the closed off end tip 6 may comprise a metal such as stainless steel, which has a higher thermal conductivity than e.g. plastic materials. Stainless steel is also easily sterilisable using known techniques, making it particularly suited for use in medical applications, just as the selected plastic materials of other components of the present invention tool.

The closed off end tip 6 can have a thermal capacitance (or heat capacity) of at most 0.03 J/° C. In an exemplary embodiment, a stainless steel material has been used with a specific thermal capacitance of 502 J/kg/K, which with a mass of the closed off end tip 6 of 0.054 g, results in a heat capacity of 0.027 J/K. However, the skilled person will appreciate that closed off end tip 6 formed of a material with a higher thermal capacity can still be used.

As shown in FIG. 2, the bore 6a of the closed off end tip 6 can be provided with a tapered distal end. The tapered distal end provides a tip 6 with a thinner end wall thickness towards the centre of the tip 6. This increases the rate of cooling in the central part of the tip 6, thus providing even more targeted cooling. The embodiment as shown in FIG. 2 may be obtained efficiently using a simple boring operation. Alternatively the bore 6a may be obtained using a milling operation, e.g. using a spherical milling tool, which would allow to obtain a closed off end tip 6 with a constant wall thickness throughout, providing an even better predictable cooling behaviour. In even further embodiments, the bore 6a may be positioned asymmetrical in the closed off end tip 6, e.g. eccentric with respect to the outer diameter. This would allow to provide an aimed cooling effect, which may be beneficial in certain surgery procedures.

In some embodiments, the closed off end tip 6 can comprise a heating element. A heating element provided in thermal communication with the material forming the closed off end tip 6 can allow rapid de-frosting for release of tissue. For example, the closed off end tip 6 can comprise one or more electrically operated heating coils, or a resistor (e.g. resistance wire) in the bore of the closed off end tip 6.

As mentioned above, embodiments of the present invention are particularly suited to ophthalmic applications and can comprise very narrow bore components. For example, the capillary 5 can have an internal lumen with an inner diameter ($d_i$) of between 50 and 100 μm, e.g. between 50 and 75 μm. Such a capillary helps maintain the cryogenic fluid as a liquid for as long as possible so that evaporation of the cryogenic fluid occurs primarily in the tip. Alternatively, the small capillary diameter ensures expansion of the cryogenic fluid at the closed off end tip 6 instead of closer to the tubular body 2. Capillaries comprising an inner bore of 50 μm have been found by the inventors of the present invention to provide sufficient fluid flow for quick and precise freezing, and are still capable of being reliably manufactured.

In at least some embodiments, the capillary 5 is a glass capillary. Glass capillaries are advantageous due to their manufacturability and small tolerances on the inner diameter and further allow for the capillary 5 to be glued to the activation mechanism 10 (see description further below).

The shaft 7 can have a wall thickness (t) of between 0.1 and 1.0 mm, e.g. 0.4 mm. The outer diameter can be between 1.8 mm and 3.8 mm (e.g. 2.8 mm). The inner bore can be between 1.0 mm and 3.6 mm (e.g. 1.6 mm). The shaft material could be of a thermally insulating material (e.g. a plastic such as POM or ABS) to increase the freezing performance at the closed off end tip 6 as described above.

Before or during a cryotherapy procedure, the closed off end tip 6 (and optionally as well at least part of the shaft 7) can be coated to minimize tissue attachment to the tip 6 and shaft 7 (e.g. with a silicone oil based layer such as Sil-Vit oil, which is used in present day ophthalmic surgery applications). The present invention can be comprised in a kit comprising a tool for cryosurgery 1 as described herein and a reservoir of silicone oil into which the tip can be dipped. In one aspect of the disclosure, there is provided a method of treatment comprising the tool for cryosurgery 1 described herein, wherein the treatment tip 4 is dipped (at least partially) in silicone oil before application of the tip to target tissue. This step can be repeated before each application of the cooling tip to tissue. The advantage of this coating is to minimize tissue attachment to the closed off end tip 6 and shaft 7, which results in a shorter release time and less risk of tissue damage due to pulling forces applied to the tissue.

Figure 3:
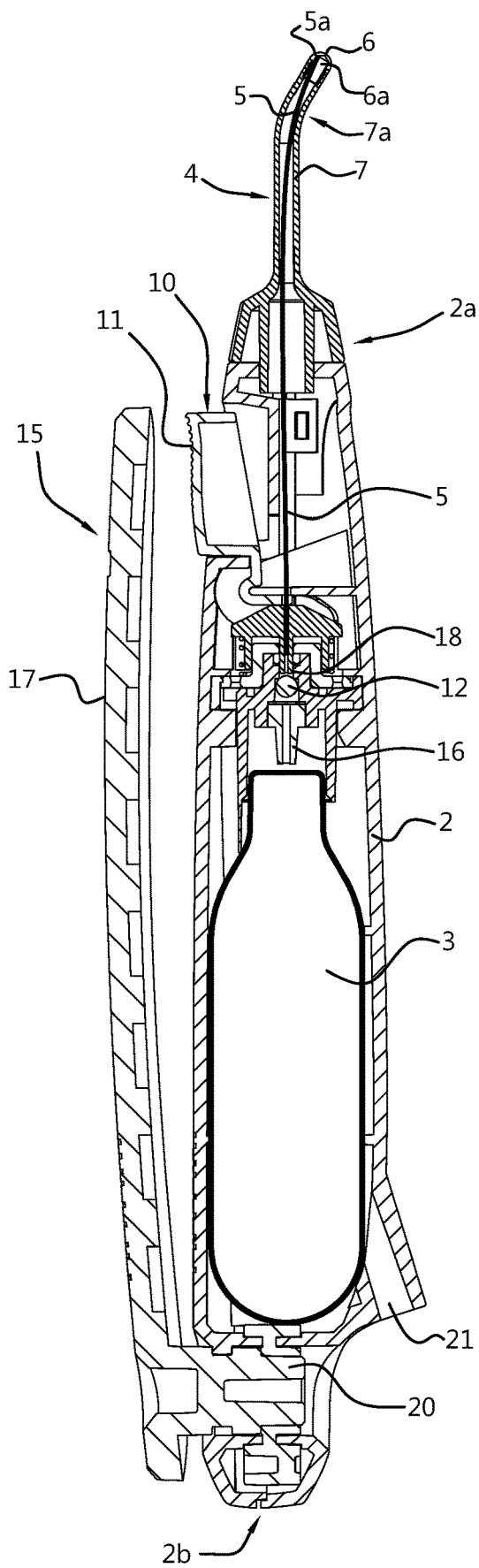
FIG. 3 shows a cross-sectional side view of the tool for cryosurgery of FIG. 1.

FIG. 3 shows a cross-sectional side view of the tool for cryosurgery described above. As shown in FIG. 3, the tool for cryosurgery 1 further comprises an actuation mechanism 10 with an operation handle 11 positioned on an outside surface of the tubular body 2. The actuation mechanism 10 is arranged for (selectively) opening a communication path from the container 3 to the capillary 5. The communication path may be opened in an on/off manner or proportionally.

The actuation mechanism 10 can comprise a valve element 12, e.g. a spring biased valve element. The valve element 12 is in an exemplary embodiment biased towards a sealing configuration in which it prevents egress of cryogenic fluid from the container 3. The actuation mechanism 10 is configured to move the valve against its bias to allow cryogenic fluid to flow from the container 3 through the capillary 5 to the closed off end tip 6. Such a configuration allows simple on/off operation to allow cryogenic fluid to flow (via press-release). Suitable valve elements 12 are known in the art and comprise e.g. spring biased ball valves. In one exemplary embodiment, such a valve could comprise a ball near a neck of the container 3, the ball being biased by a spring in a distal direction (with respect to a longitudinal axis of the housing) towards a valve seal against which the ball seals. The actuation mechanism 10 can comprise a pin configured to move proximally (with respect to the longitudinal axis of the housing) to move the ball against the bias of the spring, away from its valve seat, thereby allowing cryogenic fluid to flow from the container 3 into the capillary 5. Of course, the skilled person will appreciate that instead of moving the pin proximally with respect to the housing to unseat the ball from the valve seat, the container 3 could instead be moved in the distal direction. Other sealing means and actuation mechanisms suitable for use in connection with the present invention will be apparent to the skilled person in light of the present disclosure.

In at least some embodiments, the capillary 5 is fixedly attached to the valve element 12. The capillary 5 can thus be configured to move slightly within the shaft 7 as the actuation mechanism 10 opens the spring biased valve. The space within the inner bore 8 of the shaft 7 allows the capillary 5 to move away from the closed off end tip. However, the proximal movement of the capillary 5 is minimal. Moreover, the flexibility of the capillary 5 can be exploited to provide "slack" in the capillary 5 within the tubular body. Thus, with the capillary 5 in its most distal position relative to the container 3 (with the spring biased valve closed), the capillary 5 abuts the closed off end and is slightly bent. With the capillary 5 in its most proximal position (with the valve open), the distal end of the capillary 5 remains in the closed off end tip and is no longer bent (or is bent to a lesser extent). In a further embodiment, the length of the bore 6a is sufficient to ensure the open end of the capillary 5 is within the bore 6a of the closed off end tip 6 in both the most proximal condition and in the most distal position.

The capillary 5 can be fixedly attached e.g. glued to the spring biased valve or the actuation mechanism 10. Alternatively, the capillary 5 can be clamped or otherwise secured to the valve or the actuation mechanism 10 in a temporary or permanent fashion. Advantageously, the capillary 5 is secured at its proximal end to the valve, container 3, or actuation mechanism 10 to ensure fluid communication between the container 3 and the capillary 5. However, the capillary 5 is otherwise unsecured within the tubular body 2 or the shaft 7. This allows for ease of manufacturing and assembly of the device, in particular the placement of the capillary 5 in the shaft 7.

Referring still to FIG. 3, the treatment tip 4 can be advantageously rotatably connected to the distal end 2a of the tubular body 2. The shaft 7 may comprise an end part 7a with a longitudinal direction different from a longitudinal direction of the tubular body 2. Such an arrangement allows the tip to be oriented at the treatment site without the need to orient the whole tubular body. With the capillary 5 unsecured within the shaft 7 (as described above), such an arrangement is particularly easy to implement.

In some embodiments, an activation mechanism 15 for the container 3 can also be provided. The container activation mechanism 15 can comprise a piercing element 16 for opening the container 3, which is fixedly positioned in the tubular body 2. An activation handle 17 is arranged to force the container 3 onto the piercing element 16. For the person skilled in the art it will be clear that alternative piercing arrangements for the container 3 can be accommodated as well. The activation mechanism 15 can further comprise a filter 18. The filter is configured to prevent container debris from entering the capillary 5. The filter 18 can be comprised as part of the piercing element 16 or as a separate component.

Figure 4:
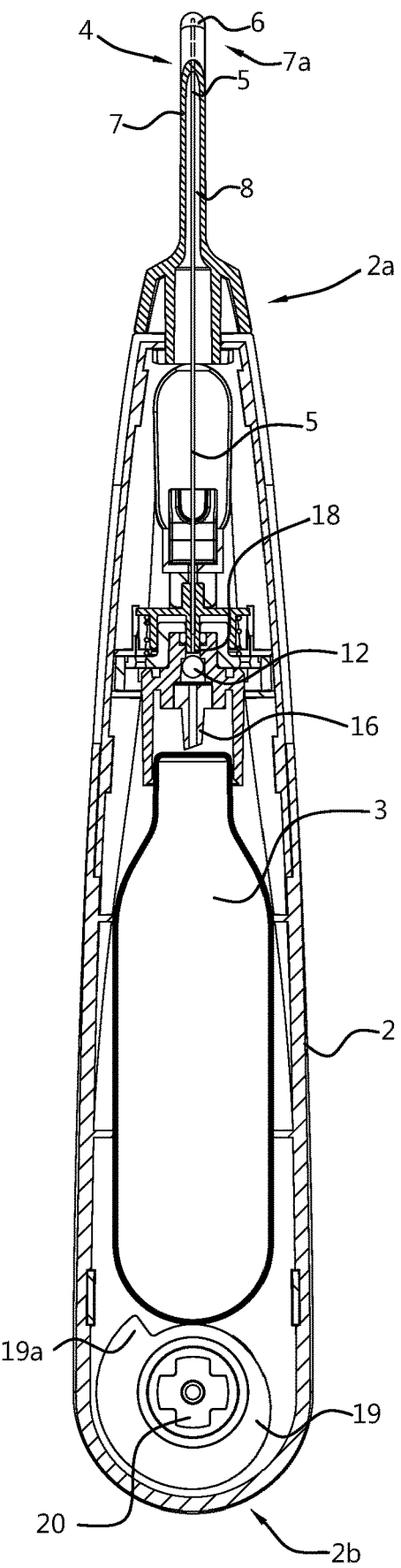
FIG. 4 shows a cross-sectional top view of the tool for cryosurgery of FIG. 1.

The activation handle 17 is most clearly shown in FIGS. 1, 3 and 4. As shown in FIG. 1, the activation handle 17 is an elongated handle pivotally attached at a proximal end 2b of the tubular body 2. As shown in FIG. 4, the elongate handle can be connected to a rotating cam element 19, which has a contact surface 19a in contact with a back end of the container 3. The handle 17 can comprise a projection configured to be received in a recess provided in the rotating cam element 19. The recess and the projection are configured such that relative rotation between the two is prevented or at least limited. This ensures that rotation of the handle 17 causes rotation of the cam element 19, which in turn pushes the cylinder towards the piercing element 16.

The contact surface 19a of the cam element 19 has an increasing radius to the centre of the rotating cam element 19 as a function of a rotation angle of the rotating cam element 19. Thus, as the cam element is rotated about its axis, it acts to force the container 3 distally, at which point the piercing element 16 pierces the container 3. Note that the cam element 19 may also be fixedly connected to the activation handle 17.

As shown in FIG. 3, the activation handle 17 can extend over and block access to the actuation mechanism 10, when it is in its initial position. Only after the activation handle 17 has been rotated (as described above) is the actuation mechanism 10 accessible to the user. Such an arrangement (with or without the actuator blocking feature) provides a tamper free indicator for the device.

The activation handle 17 can allow free rotation over first rotation range (e.g. 0-30 degrees from the start position) and activation over second rotation range (e.g. 30-180 degrees from the start position). However, the skilled person will appreciate that the abovementioned ranges are exemplary and other rotation ranges are possible.

In at least some embodiments, the activation mechanism 15 can further comprise a handle release mechanism 20 arranged to release the activation handle 17 from the tubular body 2. The handle release mechanism can allow the activation handle 17 to be removed after activation of the device. The handle release mechanism 20 can be activated in a third rotation range (e.g. 180-270 degrees from the start position). An advantage of adding such a release mechanism is that it signals the user that the activation action is completely performed.

The release mechanism 20 can comprise a locking projection that prevents the activation handle 17 from being removed until the locking projection is brought into register with a release aperture. The release aperture can be provided in the third rotation range.

The release of the handle 17 from its coupling with the cam element 19 can be automated (e.g. the handle can be ejected from engagement with the cam element 19 when it reaches the third rotation range by a biasing element, such as a spring). Alternatively, the release of the handle 17 from engagement with the cam element 19 can be achieved by pulling the handle 17 manually away from engagement with the cam element 19.

Moreover, the engagement between the handle 17 and the cam 19 can be configured such that rotation of the handle is restricted to one direction only (e.g. clockwise or anti-clockwise). The handle 17, cam element 19 and/or an intermediate linking component between the two can be configured with ratchet teeth or other surface features configured to allow rotation of the handle 19 in only one direction. In at least one example, ratchet teeth are provided on the handle 17, which engage corresponding teeth on the housing. In such an embodiment, although the cam element 19 can rotate either clockwise or anti-clockwise, the handle 17 that drives it is restricted to one direction.

In another embodiment, the cam element 19 may comprise ratchet teeth that engage a rotationally fixed component within the housing (or the housing itself). In such embodiments, rotation of the handle 17 is restricted to one direction by restricting the direction of rotation of the cam element 19, with which the handle 17 is engaged.

By restricting the rotation of the handle 17 to only one direction, partial piercing of the cylinder and return of the handle 17 to the start position can be prevented.

Returning now to FIGS. 2 and 3, a return path for cryogenic fluid can be provided between the inner part of the closed off end tip 6, via the shaft 7 and internal pathways in the tubular body 2 to an exhaust port 21. In other words, the void within the inner lumen of the shaft 7 is not completely filled by the capillary 5. This leaves a route via which cryogenic fluid can return from the tip to the interior of the tubular body 2. Where provided, the exhaust port 21 is in fluid communication with the interior of the tubular body 2, and provides an escape route for fluid from the interior of the tubular body 2 to the exterior of the device. Advantageously, the exhaust port 21 is positioned in the tubular body 2 remote from the treatment tip 4. For example, the exhaust port 21 can be provided towards a proximal end 2b of the tubular body 2. Moreover, the exhaust port 21 can be oriented at a non-zero angle with respect to the longitudinal axis of the tubular body 2. This orientation and structure will keep the flow of exhausted fluid away from the rotating cam element 19 of the activation mechanism 15.

To further direct the flow of exhaust fluid, the exhaust port 21 can comprise a tube connection element. The tube connection element can be configured to lead exhaust fluid away from the surgical site, either to a waste reservoir or into the atmosphere remote from the surgical site, e.g. using a scavenging/evacuation system. This will aid in minimizing concentration of cryogenic fluid in the air surrounding the user.

The present invention as described above with reference to a number of exemplary embodiments, may also be described by the following interrelated embodiments:

Embodiment 1. A tool for cryosurgery for handling tissue comprising:
  a tubular body (2),
  a container (3) for holding cryogenic fluid, the container (3) being positioned within the tubular body (2),
  a treatment tip (4) connected to a distal end (2a) of the tubular body (2),
  a capillary (5) for transporting cryogenic fluid from the container (3) to the treatment tip (4), wherein the treatment tip (4) comprises a closed off end tip (6) and a shaft (7) of thermally insulating material having an inner lumen (8) with a diameter ($d_i$) which is larger than an outer diameter ($d_o$) of the capillary (5), the shaft (7) being sealingly coupled to the closed off end tip (6).

Embodiment 2. The tool for cryosurgery according to embodiment 1, wherein the closed off end tip (6) comprises a bore (6a) in communication with the inner lumen (8) of the shaft (7).

Embodiment 3. The tool for cryosurgery according to embodiment 1 or 2, wherein the closed off end tip (6) comprises a material with a high thermal conductivity.

Embodiment 4. The tool for cryosurgery according to any one of embodiments 1-3, wherein the closed off end tip (6) has a thermal capacitance of at most 0.03 J/° C.

Embodiment 5. The tool for cryosurgery according to any one of embodiments 1-4, wherein the closed off end tip (6) comprises a heating element.

Embodiment 6. The tool for cryosurgery according to any one of embodiments 1-5, wherein the capillary (5) has an internal lumen with a diameter ($d_i$) of between 50 and 100 µm.

Embodiment 7. The tool for cryosurgery according to any one of embodiments 1-6, wherein the capillary (5) is a glass capillary.

Embodiment 8. The tool for cryosurgery according to any one of embodiments 1-7, wherein the shaft (7) has a wall thickness (t) of between 0.1 and 1.0 mm, e.g. 0.4 mm.

Embodiment 9. The tool for cryosurgery according to any one of embodiments 1-8, wherein the closed off end tip (6) is coated with a silicone oil based layer.

Embodiment 10. The tool for cryosurgery according to any one of embodiments 1-9, further comprising an actuation mechanism (10) with an operation handle (11) positioned on an outside surface of the tubular body (2), the actuation mechanism (10) being arranged for opening a communication path from the container (3) to the capillary (5).

Embodiment 11. The tool for cryosurgery according to embodiment 10, wherein the actuation mechanism (10) comprises a valve element (12).

Embodiment 12. The tool for cryosurgery according to embodiment 11, wherein the capillary (5) is fixedly attached to the valve element (12).

Embodiment 13. The tool for cryosurgery according to any one of embodiments 1-12, wherein the treatment tip (4) is rotatably connected to the distal end (2a) of the tubular body (2), and the shaft (7) comprises an end part (7a) with a longitudinal direction different from a longitudinal direction of the tubular body (2).

Embodiment 14. The tool for cryosurgery according to any one of embodiments 1-13, further comprising an activation mechanism (15) for the container (3), the activation mechanism (15) comprising a piercing element (16) fixedly positioned in the tubular body (2) and an activation handle (17) arranged to force the container (3) onto the piercing element (16).

Embodiment 15. The tool for cryosurgery according to embodiment 14, wherein the activation mechanism (15) comprises a filter (18).

Embodiment 16. The tool for cryosurgery according to embodiment 14 or 15, wherein the activation handle (17) is an elongated handle pivotally attached at a proximal end (2b) of the tubular body (2) and connected to a rotating cam element (19), the rotating cam element (19) having a contact surface (19a) in contact with a back end of the container (3), the contact surface (19a) having an increasing radius to the centre of the rotating cam element (19) as a function of the rotation angle of the rotating cam element (19).

Embodiment 17. The tool for cryosurgery according to any one of embodiments 14-16, wherein the activation mechanism (15) further comprises a handle release mechanism (20) arranged to release the activation handle (17) from the tubular body (2).

Embodiment 18. The tool for cryosurgery according to any one of embodiments 1-17, wherein a return path for cryogenic fluid is provided between the inner part of the closed off end tip (6), via the shaft (7) and internal pathways in the tubular body (2) to an exhaust port (21).

Embodiment 19. The tool for cryosurgery according to embodiment 18, wherein the exhaust port (21) is positioned in the tubular body (2) remote from the treatment tip (4).

Embodiment 20. The tool for cryosurgery according to embodiment 18 or 19, wherein the exhaust port (21) comprises a tube connection element.

The present invention has been described above with reference to a number of exemplary embodiments as shown in the drawings. Modifications and alternative implementations of some parts or elements are possible, and are included in the scope of protection as defined in the appended claims.

The invention claimed is:

1. A tool for cryosurgery for handling tissue in ophthalmic surgical procedures, the tool comprising:
  a tubular body;
  a container for holding cryogenic fluid, the container being positioned within the tubular body;
  a treatment tip comprising
    a shaft of thermally insulating material having a first end and a second end, wherein the first end of the shaft of thermally insulating material is configured to rotatably and directly connect to a distal end of the tubular body so that the first end is inside the tubular body and extends outwards from the distal end of the tubular body so that the second end is outside the tubular body, and
    a closed off end tip attached to the second end of the shaft of thermally insulating material, wherein the closed off end tip is sealingly coupled to the second end of the shaft of thermally insulating material;

a capillary for transporting cryogenic fluid from the container to the closed off end tip of the treatment tip, the shaft of thermally insulating material having an inner lumen with a diameter (dl) which is larger than an outer diameter (do) of the capillary, and an activation mechanism for the container comprising a piercing element fixedly positioned in the tubular body and an activation handle configured to force the container onto the piercing element and coupled to a rotating cam element arranged in the tubular body, wherein the activation handle is configured to rotate from a starting position, in which the container is unopened, in a first rotation range into an activation position in a second rotation range and to rotate further from the activation position into a release position in a third rotation range, and the activation handle is adapted to disengage from the rotating cam element in the third rotation range.

2. The tool for cryosurgery according to claim 1, wherein the closed off end tip comprises a bore in communication with the inner lumen of the shaft.

3. The tool for cryosurgery according to claim 1, wherein the closed off end tip comprises a material with a high thermal conductivity.

4. The tool for cryosurgery according to claim 1, wherein the closed off end tip has a thermal capacitance of at most 0.03 J/° C.

5. The tool for cryosurgery according to claim 1, wherein the closed off end tip comprises a heating element.

6. The tool for cryosurgery according to claim 1, wherein the capillary has an internal lumen with a diameter (di) of between 50 and 100 µm.

7. The tool for cryosurgery according to claim 1, wherein the capillary is a glass capillary.

8. The tool for cryosurgery according to claim 1, wherein the shaft has a wall thickness (t) of between 0.1 and 1.0 mm.

9. The tool for cryosurgery according to claim 1, wherein the closed off end tip is coated with a silicone oil based layer.

10. The tool for cryosurgery according to claim 1, further comprising an actuation mechanism with an operation handle positioned on an outside surface of the tubular body, the actuation mechanism being arranged for opening a communication path from the container to the capillary.

11. The tool for cryosurgery according to claim 10, wherein the actuation mechanism comprises a valve element.

12. The tool for cryosurgery according to claim 11, wherein the capillary is fixedly attached to the valve element.

13. The tool for cryosurgery according to claim 1, wherein the treatment tip is rotatably connected to the distal end of the tubular body, and the shaft comprises an end part with a longitudinal direction different from a longitudinal direction of the tubular body.

14. The tool for cryosurgery according to claim 1, wherein the activation mechanism comprises a filter.

15. The tool for cryosurgery according to claim 1, wherein the rotating cam element has a contact surface in contact with a back end of the container, and the contact surface has an increasing radius to the center of the rotating cam element as a function of the rotation angle of the rotating cam element.

16. The tool for cryosurgery according to claim 1, wherein the activation mechanism further comprises a handle release mechanism configured to uncouple the activation handle from the rotating cam element and release the activation handle from the tubular body.

17. The tool for cryosurgery according to claim 16, wherein the handle release mechanism comprises a locking projection adapted to prevent release of the activation handle in the first and second rotation ranges.

18. The tool for cryosurgery according to claim 1, wherein a return path for cryogenic fluid is provided between an inner part of the closed off end tip, via the shaft and internal pathways in the tubular body to an exhaust port.

19. The tool for cryosurgery according to claim 1, wherein the closed off end tip is detachable from the shaft of thermally insulating material.

20. The tool for cryosurgery according to claim 1, wherein the activation handle is arranged to extend over an actuation mechanism configured to open a communication path between the container and the capillary when in the starting position such that user access to the actuation mechanism is blocked.

21. The tool for cryosurgery according to claim 1, wherein the activation mechanism further comprises one or more surface features adapted to permit rotation of the activation handle in only one direction.

* * * * *